United States Patent
Minutillo et al.

(10) Patent No.: US 8,451,222 B2
(45) Date of Patent: May 28, 2013

(54) CONVERGED DESKTOP BETWEEN A PC AND A TRADING TURRET

(75) Inventors: Stephen Joseph Minutillo, North Haven, CT (US); Aseem Bakshi, Stamford, CT (US); Rajnish Jain, Fairfield, CT (US)

(73) Assignee: IPC Systems, Inc., Jersey City, NJ (US)

( * ) Notice: Subject to any disclaimer, the term of this patent is extended or adjusted under 35 U.S.C. 154(b) by 549 days.

(21) Appl. No.: 12/562,347

(22) Filed: Sep. 18, 2009

(65) Prior Publication Data
US 2010/0110004 A1    May 6, 2010

Related U.S. Application Data

(60) Provisional application No. 61/111,441, filed on Nov. 5, 2008.

(51) Int. Cl.
*G06F 3/033* (2006.01)

(52) U.S. Cl.
USPC ............ 345/157; 345/156; 715/718; 715/778

(58) Field of Classification Search
USPC .................................. 715/718, 778
See application file for complete search history.

(56) References Cited

U.S. PATENT DOCUMENTS

| | | | |
|---|---|---|---|
| 5,649,005 A * | 7/1997 | Lynch et al. | 379/242 |
| 6,069,615 A | 5/2000 | Abraham et al. | |
| 6,295,051 B1 | 9/2001 | Kanevsky et al. | |
| 6,469,690 B1 | 10/2002 | Abraham et al. | |
| 6,639,583 B1 | 10/2003 | Bohn | |
| 7,206,868 B2 | 4/2007 | Shapiro et al. | |
| 7,921,373 B2 * | 4/2011 | Yamashita et al. | 715/778 |
| 7,978,172 B2 * | 7/2011 | Fujita | 345/156 |
| 2003/0211865 A1 | 11/2003 | Azami et al. | |
| 2004/0001044 A1 * | 1/2004 | Luciani et al. | 345/157 |
| 2004/0027387 A1 | 2/2004 | Nason et al. | |
| 2005/0068253 A1 * | 3/2005 | Bartels | 345/1.3 |
| 2010/0064245 A1 * | 3/2010 | Smith et al. | 715/778 |
| 2011/0153793 A1 * | 6/2011 | Tan | 709/222 |

OTHER PUBLICATIONS

"About Synergy", http://synergy2.sourceforge.net/about.html, last visited Aug. 24, 2009.
"Synergy Developer Documentation", http://synergy2.sourceforge.net/developer.html, last visited Aug. 24, 2009.
"Synergy", http://synergy2.sourceforge.net/home.html, last visited Aug. 24, 2009.
"Input Director", http://www.inputdirector.com, last visited Aug. 24, 2009.
International Search Report and Written Opinion of the International Searching Authority, PCT/US2009/062279, Dec. 17, 2009.

* cited by examiner

*Primary Examiner* — Lixi C Simpson
(74) *Attorney, Agent, or Firm* — Fitzpatrick, Cella, Harper & Scinto

(57) ABSTRACT

A personal computer and a telephony device are integrated using an input director and an input receiver. The input director is configured to receive an instruction from a user interface device, the instruction corresponding to a function of the telephony device. The input receiver is configured to receive the instruction from the input director and control the telephony device based on the instruction.

27 Claims, 7 Drawing Sheets

PRIOR ART

CONVERGED DESKTOP BETWEEN A PC AND A TRADING TURRET

CROSS REFERENCE TO RELATED APPLICATIONS

This application claims priority to, and the benefit of, U.S. Provisional Patent Application Ser. No. 61/111,441, filed Nov. 5, 2008, which is hereby incorporated by reference in its entirety.

BACKGROUND OF THE INVENTION

1. Field of the Invention

The present invention generally relates to integration of personal computers (PCs) and telephony devices, and more particularly to key telephone systems and trading turrets.

2. Related Art

A trading voice communications system is a specialized key telephone system that allows a relatively small number of users to access a large number of external lines and provides enhanced communication features such as hoot-n-holler, push-to-talk, intercom, video and large-scale conferencing. These features are often utilized in the financial industry such as trading floor environments, as well as security/law enforcement, utilities, healthcare, and customer support (e.g., contact centers) environments.

Users interface with the trading voice communications system through a trading turret desktop device, which is typically a modular, voice communications desktop device with multiple handsets, speakers and buttons including a variety of programmable buttons. Some of these buttons represent private lines with external trading partners or extension numbers of internal traders. Either traders themselves or operations support personnel program (or assign functions to) the buttons on a turret. A typical turret also has a variety of screens for rendering the status of buttons and other applications.

Financial trading floors are typically fast paced and tightly packed environments. With space at a premium and for other collaboration and productivity reasons, the trading desks are typically small and arranged adjacent to each other.

FIG. 1 illustrates a typical trading desk arrangement. As shown in FIG. 1, a trading desk is typically equipped with a personal computer (PC) 102 connected to several monitors 104, a mouse 106, a keyboard 108 (i.e., user interface devices) and a trading turret 110. The arrangement of these devices on the trader's desk is not arbitrary. This arrangement is very carefully designed with the goals of achieving maximum trader speed and productivity.

Typically, the trading turret 110 and the PC 102 are two completely decoupled devices. The trader interacts with the PC 102 through the monitors 104, keyboard 108 and mouse 106 and interacts with the trading turret 110 by pressing the keys on the turret and through audio mediums such as a handset and speakers.

FIG. 2 depicts a typical personal computer (PC) windowing system. In conventional PC windowing systems, input devices such as keyboard 208 and mouse 206 are handled directly by the windowing system 202. Particularly, mouse movements and keyboard inputs are delivered directly to the windowing system 202 and used to visually manipulate controls on the screens 210 generated by the applications running on the PC.

Lacking in today's trading desk arrangement is the ability to extend the functionality of the keyboard and mouse that are connected to a PC for interacting with a turret device to provide a converged desktop surface between the PC and a turret.

BRIEF DESCRIPTION OF THE INVENTION

The present invention meets the above-identified needs by providing a system, method and computer program product for providing a converged desktop between a PC and a trading turret.

In an example aspect of the present invention, a system for integrating a personal computer and a telephony device is provided including an input director configured to receive an instruction from a user interface device, where the instruction corresponds to a function of the telephony device. The system also includes an input receiver configured to receive the instruction from the input director and control the telephony device based on the instruction.

In another example aspect of the present invention, a method for integrating a personal computer and a telephony device is provided including receiving an instruction from a user interface device, the instruction corresponding to a function of the telephony device and controlling the telephony device based on the instruction.

In yet another example embodiment of the present invention, a computer-readable medium is provided. The computer-readable medium has stored thereon sequences of instructions, the sequences of instructions including instructions which when executed by a computer system causes the computer system to perform receiving an instruction from a user interface device, the instruction corresponding to a function of a telephony device and controlling the telephony device based on the instruction.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the following drawings.

DETAILED DESCRIPTION

I. Overview

Generally a seamless, virtual desktop control environment is provided on the trading desk, which allows a trader to exchange information between a PC and a turret with gestures such as copy and paste, drag and drop using clicks of mouse buttons. The trader also is provided the ability to quickly program speed-dials behind their turret buttons by copying and pasting contacts that may appear on their PC. This allows traders to perform click-to-dial and initiate other such telephony actions through keyboard button presses and mouse clicks.

II. System

Figure 1:
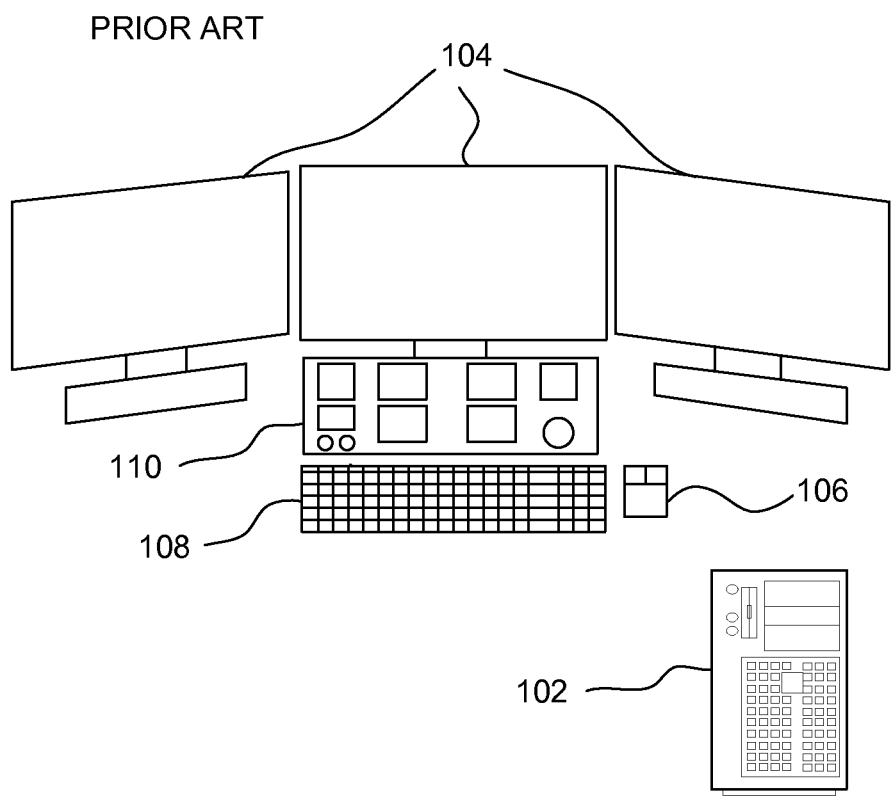
FIG. 1 illustrates a typical trading desk arrangement.
Figure 2:
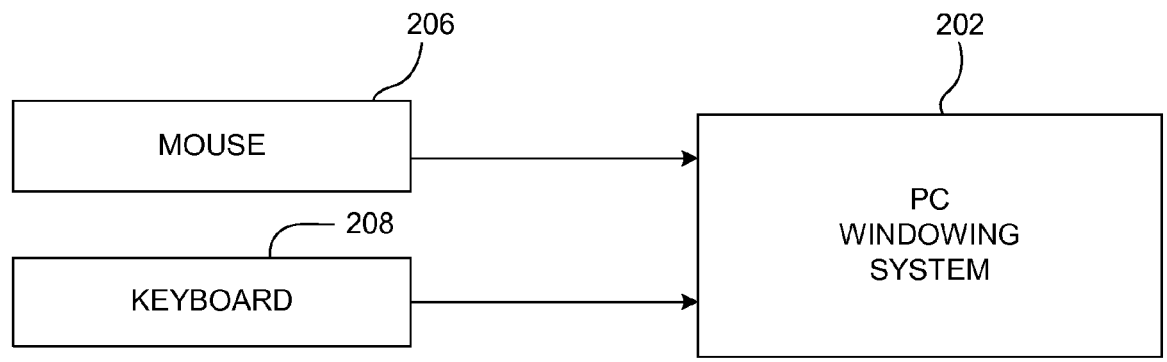
FIG. 2 depicts a typical personal computer windowing system.
Figure 2:
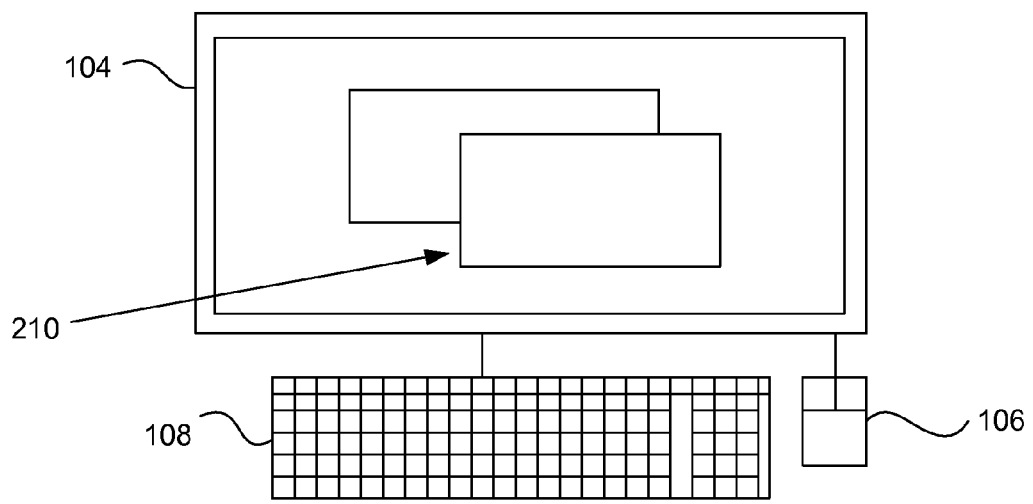
Figure 3:
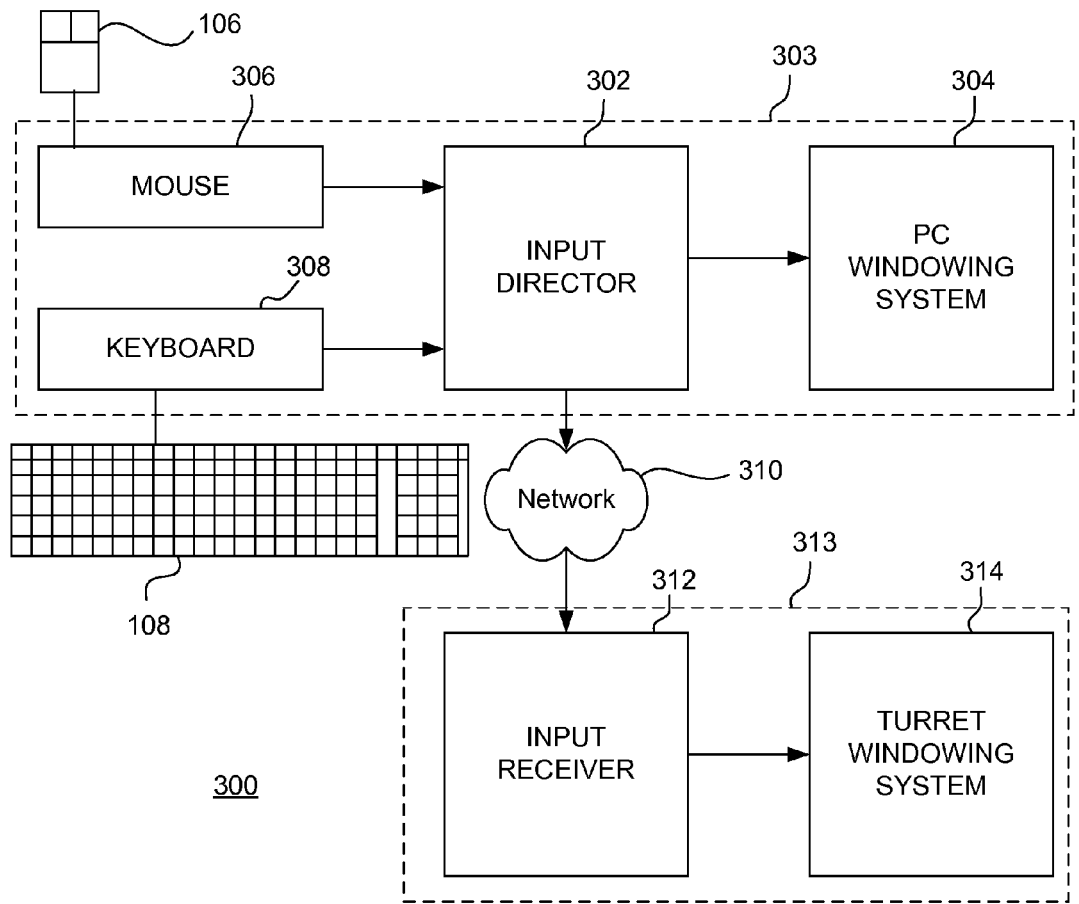
FIG. 3 depicts a keyboard and mouse connected to multiple windowing systems in accordance with an embodiment of the present invention.

FIG. 3 depicts a keyboard and a mouse (or similar pointing device) connected to multiple windowing systems 300 in accordance with an embodiment of the present invention. The keyboard and mouse are dynamically redirected to a turret screen by moving the mouse off of the edge of the PC monitor. This causes the windowing system of the turret device to become activated. In an example embodiment, an input director 302 runs on the PC 303 connected to a mouse 106 and a keyboard 108, or other input device (not shown). The input director 302 intercepts all mouse input received from a mouse handler 306 and keyboard input received from a keyboard handler 308 and delivers the respective input messages to the PC windowing system 304, or across a network 310 to an input receiver 312 running on a trading turret device 313. The input receiver 312, in turn, delivers the input it receives from the input director 308 to the turret device's windowing system 314.

Figure 4:
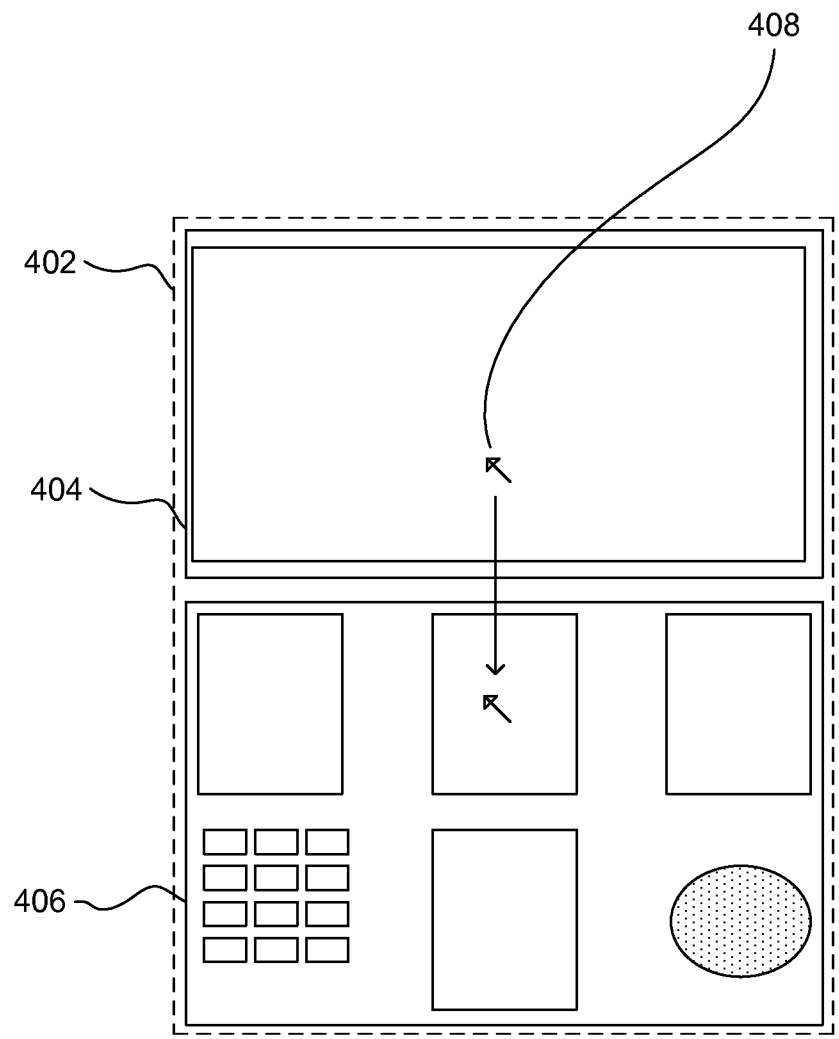
FIG. 4 illustrates an exemplary screen shot of a virtual desktop showing a transition between a PC application and a telephony device on the virtual desktop, based on the keyboard and mouse focus.

FIG. 4 illustrates an exemplary screen shot of a virtual desktop 402 showing a transition between a PC application and a telephony device on the virtual desktop 402, based on the keyboard and mouse focus 408. With reference also to FIG. 3, the input director 302 is configured with the dimensions and positions of the PC desktop 404, as well as all screens corresponding to a telephony device 406. The input director 302 uses this information to construct the virtual desktop 402 that spans the PC desktop 404 and the telephony device 406.

When a mouse pointer 408 (also commonly referred to as a "cursor") is moved off the edge of the PC desktop 404, the input director 302 stops delivering input to the PC windowing system 304 and sends the input over network 310 to the input receiver 312 on the telephony device. In the event the turret windowing system is inactive or minimized, this causes it to be reactivated and/or maximized.

The input receiver 312 delivers the input to the telephony device's windowing system 314, which then delivers it to any running applications on the turret device. Similarly, keyboard input received from keyboard handler 308 is sent to the device presently associated with the mouse pointer.

Communication from the turret device 313 back to the PC 303 is possible as well. This allows any data, such as the contents in a copy/paste buffer, to be communicated between the turret device 313 and PC 303 in either direction through their respective communications interfaces and over the network 310.

III. Processes

Figure 5:
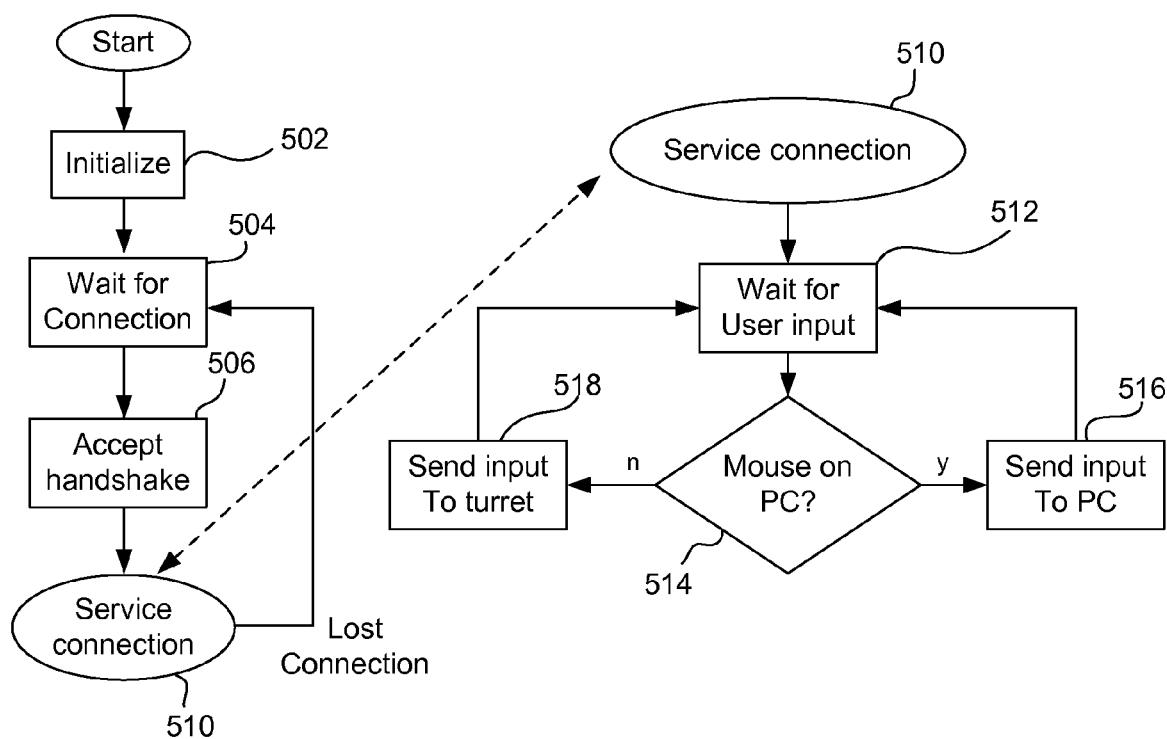
FIG. 5 illustrates a flowchart of an example process for providing a service connection to an input director in accordance with an embodiment of the present invention.

FIG. 5 illustrates a flowchart of an example process 500 for providing a service connection to an input director in accordance with an embodiment of the present invention. During initialization at block 502, the input director 302 queries the local PC windowing system 302 for the dimensions of the screen and, at block 504, waits for a handshake request from the input receiver 312 running on the telephony device. After successfully accepting the handshake request (block 506), a service connection is made at block 510. Should the service connection be lost, the input director reverts to waiting for another connection by looping back to block 504.

Once a service connection has been established (block 510), input director 302 waits for user input, as shown in block 512. Input director 302 intercepts all mouse and keyboard input, forwarding it onto the local PC windowing system 304 as long as the mouse is still within the PC desktop space (FIG. 4, 404).

If a determination is made at block 514 that the mouse is on the PC desktop space 404, then input is sent to the PC windowing system 304, as shown in block 516. When the mouse input reaches an edge of the screen that is adjacent to the edge of a screen on the trading turret screen (FIG. 4, 406), the input director 302 hides the mouse pointer on the PC virtual desktop 402 and send the input to the turret windowing system as shown in block 518. Particularly, the input director 302 sends a message to the input receiver 312 informing it that the mouse pointer has entered its space. This message contains the identifier of the screen, and the physical coordinates that the mouse pointer should appear at, which was derived by the input director 302 by mapping the virtual screen coordinates onto the physical screen dimensions. The input receiver 312 then displays the mouse pointer locally on the appropriate screen.

As the mouse is moved, the input director 302 continues to receive raw mouse input, and translates it into new mouse positions on the trading turret screen 406, and sends the translated mouse input to the input receiver 312 as the mouse position updates. User keyboard input and mouse clicks are also sent through the same connection to the input receiver 312. When the user moves the mouse pointer back across the edge to the PC desktop 404, a message is sent to the input receiver 312 to hide the mouse pointer.

Figure 6:
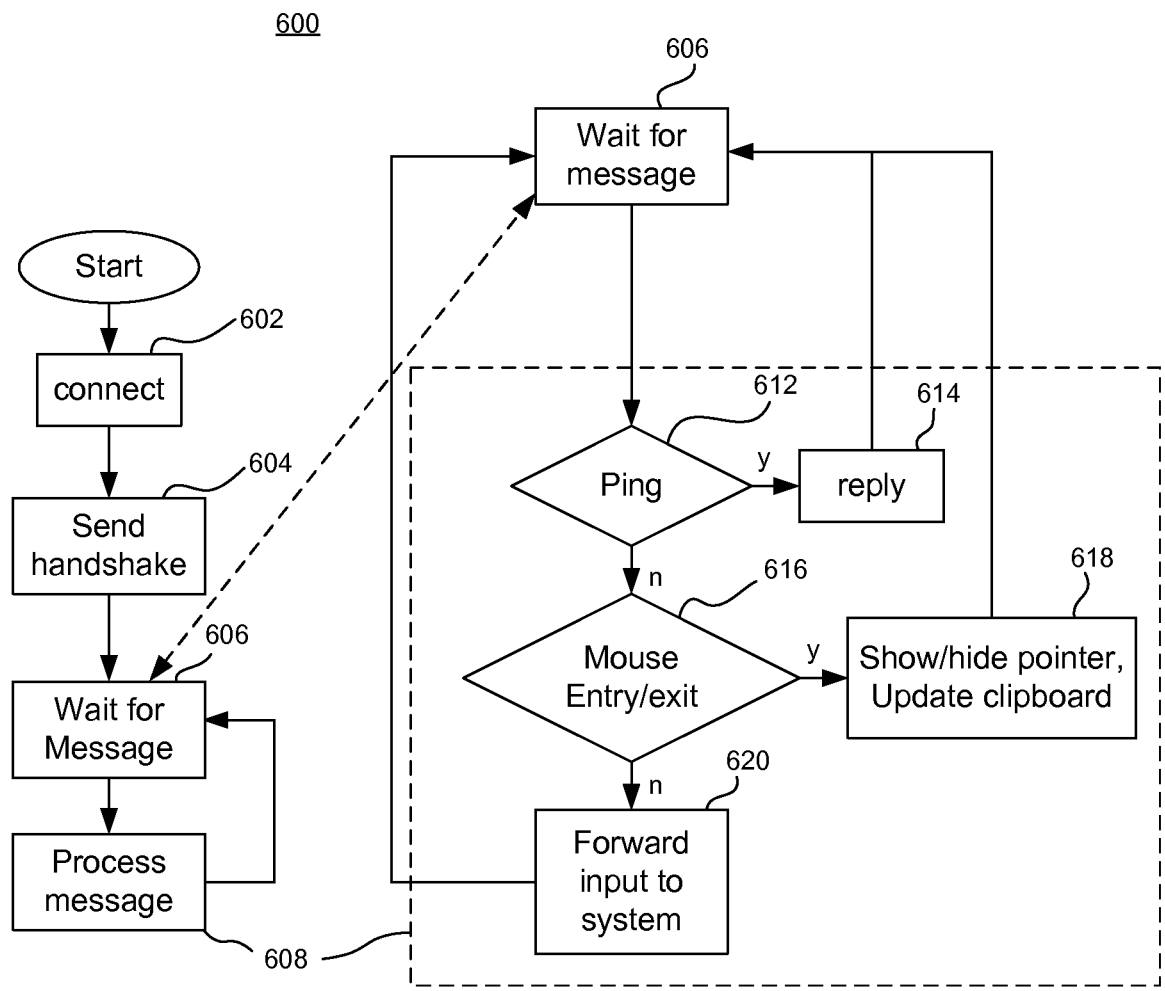
FIG. 6 illustrates a flowchart of an example process performed by an input receiver for handling a message in accordance with an embodiment of the present invention.

FIG. 6 illustrates a flowchart of an example process 600 performed by an input receiver for handling a message in accordance with an embodiment of the present invention. Input receiver 312, having been configured with the network address of the PC, makes a connection to the input director 302, such as a TCP connection, as shown in block 602. Once that is established, at block 604, the input receiver 312 sends a handshake message with a registration message, with the dimensions of the turret windowing system screens, and then waits for subsequent messages from the input director 302. After establishing a connection, the input receiver 312 waits for a message, as shown in block 606. At block 608, input receiver 312 processes messages upon receipt.

To verify network connectivity, and that the input receiver 312 is functioning normally, the input director 302 sends a periodic 'ping' message across the network 310 to the input receiver 312. At the input receiver 312, upon receipt of a message, a determination is made at block 612 whether the message is a 'ping' message. If so, then at block 614, the input receiver 312 sends a reply to the input director 302. This occurs for each "ping" message.

If the input director 302 does not receive a reply message within a configurable timeout, the connection to the trading turret is deemed to have been disconnected and the input director 302 severs the connection. Input director 302 then waits for a new connection to be requested by the input receiver 312, as described above with respect to FIG. 5, blocks 502-508 and FIG. 6, blocks 602-604.

If a determination is made at block 612 that the message is not a 'ping' message, a determination is made at block 616 whether the message corresponds to a mouse entry or exit message. If so, then at block 618 the input receiver 312 shows or hides the pointer, correspondingly, and updates the windowing system clipboard. In other words, the contents of a PC clipboard are also synchronized between the PC windowing system 304 and the trading turret windowing system 314. When the mouse pointer transitions from one system to the other, the clipboard of the system where the mouse pointer is being moved from is copied, and the contents are sent across the network 310 to the system where the mouse is being moved to. These contents are then inserted into the clipboard of the target system. This enables the native "copy", "cut", and "paste" operations to work between the PC and trading turret.

If a determination is made at block 616 that the message is not a mouse entry or exit message, then at block 620 the message is input to the turret windowing system 314.

Additionally, if a "drag" operation is in process when the mouse pointer transitions from the PC windowing system 304 to the trading turret windowing system 314, the data being dragged is sent to the input receiver 312 and placed in a buffer. When a mouse button is released over the trading turret (a "drop") this data can be accessed by the underlying application to implement drag and drop copying of data.

The input receiver 312 uses the dimensions of all screens, and knowledge of their physical locations, to form a map of the entire virtual desktop surface. This map may be non-rectangular, but preferably is contiguous.

The protocol used between input director 302 and input receiver 312, in an example embodiment, is built on Transmission Control Protocol (TCP). The input director 302 is the TCP server, and the input receiver 312 connects on a known port. Each message is includes three sections:

Message length, sent as a 4 byte integer in network byte order

Message type, sent as 4 ASCII characters

Message payload, which varies based on the message type

The message payloads are made up of integers (4 byte integers in network byte order), and blocks of binary data that are preceded by their lengths as integers. For instance, the registration sent by the input receiver 312 to input director 302 for a trading turret with two (2) screens, named "A" and "B" each with a dimension of 240×320 is shown below. Numbers in angle brackets are integers, and letters are sent as plain ASCII:

<34> H E L O <2> <1> A <240> <320> <1> B <240> <320>

The total message length is 34
The message type is HELO
This HELO message registers 2 screens
The length of the first screen's name is 1 byte
The name of the first screen is "A"
The dimensions of the first screen are 240 by 320
The length of the second screen's name is 1 byte
The name of the second screen is "B"
The dimensions of the second screen are 240×320

Most messages require no reply from the input receiver 312, but for those that do, the input receiver 312 uses the same format to send messages back to the server along the same TCP connection. For instance, on receipt of the periodic PING message from the server:

<4> PING

The client will respond:

<4> PONG

Another example message is a mouse movement. This message tells the input receiver 312 that the position of the mouse pointer is now on screen B at 100, 50:

<4> M O U S <1> B <100> <50>

IV. Example Implementations

The present invention (i.e., system 300, processes 500, 600 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 7:
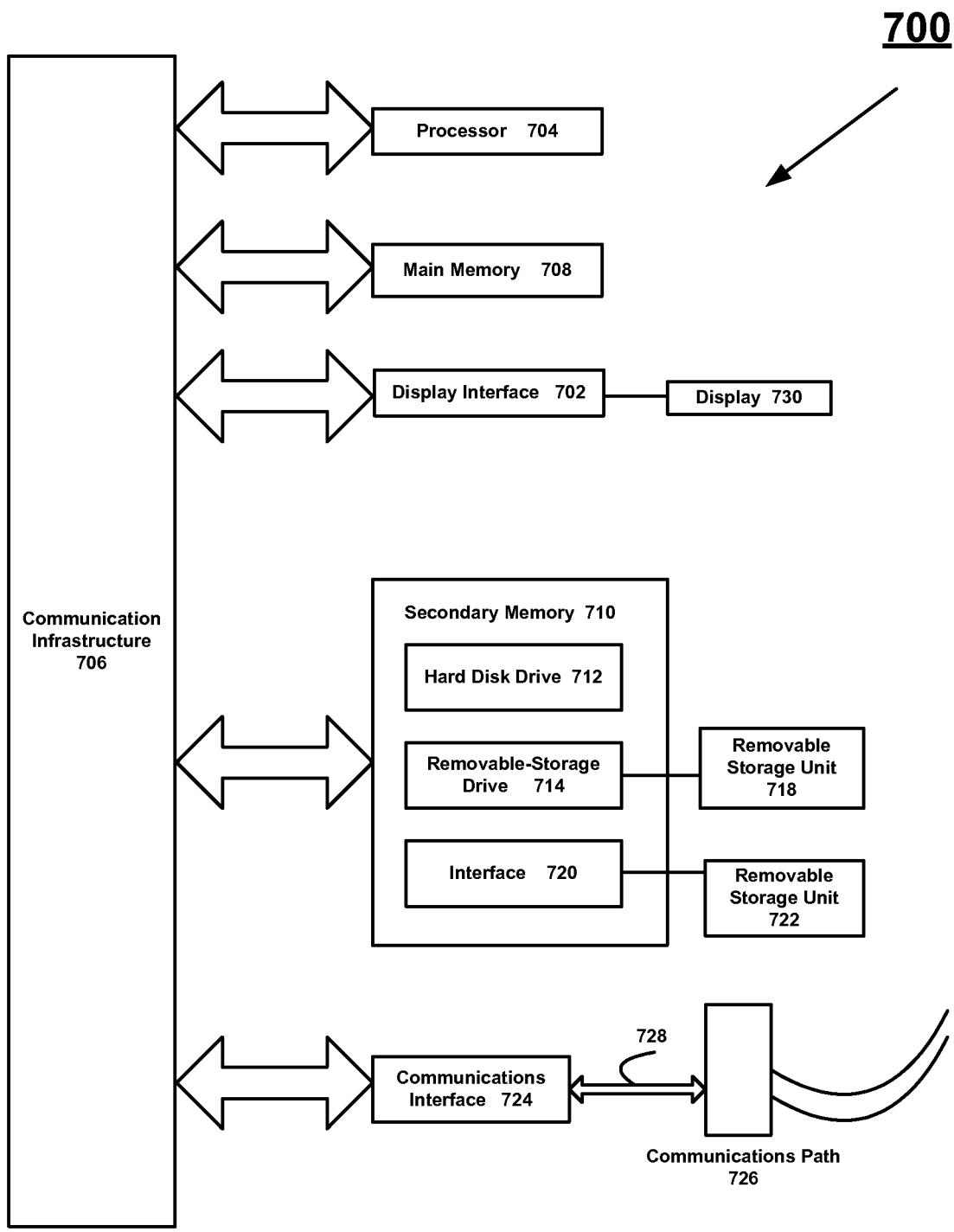
FIG. 7 is a block diagram of an exemplary computer system useful for implementing the present invention.

In fact, in one embodiment, the invention is directed toward one or more computer systems capable of carrying out the functionality described herein. An example of a computer system 700 is shown in FIG. 7.

The computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 530.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium (e.g., computer-readable medium) having stored therein computer software and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium", "computer usable medium" and "computer-readable medium" are used to generally refer to media such as removable storage drive 714, a hard disk installed in hard disk drive 712, and signals 728. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs) Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A system for integrating a personal computer and a telephony device, comprising:
    an input director, of the personal computer, configured to:
        receive an instruction from a user interface device,
        determine location information of a pointing device; and
        based on the location information, either:
            (i) transmit the instruction to a windowing system of the personal computer and cause a cursor to be displayed on a desktop display of the personal computer, or
            (ii) transmit the instruction to the telephony device and cause the cursor to be displayed on at least one screen of the telephony device; and
    an input receiver, of the telephony device, configured to receive the instruction from the input director via a communication network and provide the instruction to an application, to implement a function based on the instruction.

2. The system according to claim 1, wherein the input director is further configured to identify a plurality of physical coordinates associated with the pointing device on at least one display, the plurality of physical coordinates spanning across the desktop display of the personal computer associated with the windowing system of the personal computer and the at least one screen of the telephony device.

3. The system according to claim 2, wherein when the pointing device is moved off an edge of the desktop display of the personal computer a telephony device windowing system is activated.

4. The system according to claim 2, wherein the input director is further configured to construct a virtual desktop spanning the desktop display of the personal computer and the at least one screen of the telephony device and move the cursor across the desktop display and the at least one screen based on the plurality of physical coordinates.

5. The system according to claim 1, wherein the input director transmits the instruction over the communication network and the input receiver receives the instruction from the communication network.

6. The system according to claim 1, wherein the input director stores a dimension of the desktop display of the personal computer and a dimension of the at least one screen of the telephony device.

7. The system according to claim 1, wherein the input receiver is further configured to transmit a handshake request over the communication network to the input director to establish a connection between the personal computer and the telephony device.

8. The system of claim 1, wherein the input receiver is further configured to identify a function associated with the instruction.

9. The system according to claim 1, wherein the user interface device includes a mouse or a keyboard.

10. A method for integrating a personal computer and a telephony device, comprising the steps of:
    receiving, by an input director of the personal computer, an instruction from a user interface device;
    determining location information of a pointing device;
    based on the location information, either:
        (i) transmitting the instruction to a windowing system of the personal computer and causing a cursor to be displayed on a desktop display of the personal computer, or
        (ii) transmitting the instruction to the telephony device and causing the cursor to be displayed on at least one screen of the telephony device;

receiving, by an input receiver of the telephony device, the instruction from the input director via a communication network; and providing the instruction to an application, to implement a function based on the instruction.

11. The method according to claim 10, further comprising the step of:

identifying a plurality of physical coordinates associated with the pointing device on at least one display, the plurality of physical coordinates spanning across the desktop display of the personal computer associated with the windowing system of the personal computer and the at least one screen of the telephony device.

12. The method according to claim 11, further comprising the step of:

activating a telephony device windowing system when the pointing device is moved off an edge of the desktop display of the personal computer.

13. The method according to claim 11, further comprising the steps of:

constructing a virtual desktop spanning the desktop display of the personal computer and the at least one screen of the telephony device; and moving the cursor across the desktop display and the at least one screen based on the plurality of physical coordinates.

14. The method according to claim 10, further comprising the step of:

transmitting the instruction over the communication network to an input receiver configured to control the telephony device based on the instruction.

15. The method according to claim 10, further comprising the step of:

storing a dimension of the desktop display of the personal computer and a dimension of the at least one screen of the telephony device.

16. The method according to claim 10, further comprising the steps of:

transmitting a handshake request over the communication network to the input director; and establishing a connection between the personal computer and the telephony device.

17. The method of claim 10, wherein further comprising identifying, by the input receiver, a function associated with the instruction.

18. The method according to claim 10, wherein the user interface device includes a mouse or a keyboard.

19. A non-transitory computer-readable medium having stored thereon sequences of instructions, the sequences of instructions including instructions which when executed by a computer system causes the computer system to perform:

receiving, by an input director of a personal computer, an instruction from a user interface device;

determining location information of a pointing device;

based on the location information, either:

(i) transmitting the instruction to a windowing system of the personal computer and causing a cursor to be displayed on a desktop display of the personal computer, or (ii) transmitting the instruction to the telephony device and causing the cursor to be displayed on at least one screen of the telephony device;

receiving, by an input receiver of the telephony device, the instruction from the input director via a communication network; and providing the instruction to an application, to implement a function based on the instruction.

20. The non-transitory computer-readable medium of claim 19, further having stored thereon a sequence of instructions which when executed by the computer system causes the computer system to perform:

identifying a plurality of physical coordinates associated with the pointing device on at least one display, the plurality of physical coordinates spanning across the desktop display of the personal computer associated with the windowing system of the personal computer and the at least one screen of the telephony device.

21. The non-transitory computer-readable medium of claim 20, further having stored thereon a sequence of instructions which when executed by the computer system causes the computer system to perform:

activating a telephony device windowing system when the pointing device is moved off an edge of the desktop display of the personal computer.

22. The non-transitory computer-readable medium of claim 20, further having stored thereon a sequence of instructions which when executed by the computer system causes the computer system to perform:

constructing a virtual desktop spanning the desktop display of the personal computer and the at least one screen of the telephony device; and moving the cursor across the desktop display and the at least one screen based on the plurality of physical coordinates.

23. The non-transitory computer-readable medium of claim 19, further having stored thereon a sequence of instructions which when executed by the computer system causes the computer system to perform:

transmitting the instruction over the communication network to an input receiver configured to control the telephony device based on the instruction.

24. The non-transitory computer-readable medium of claim 19, further having stored thereon a sequence of instructions which when executed by the computer system causes the computer system to perform:

storing a dimension of the desktop display of the personal computer and a dimension of the at least one screen of the telephony device.

25. The non-transitory computer-readable medium of claim 19, further having stored thereon a sequence of instructions which when executed by the computer system causes the computer system to perform:

transmitting a handshake request over the communication network to the input director; and establishing a connection between the personal computer and the telephony device.

26. The non-transitory computer-readable medium of claim 19, wherein the sequences of instructions further include instructions which, when executed by a computer system, cause the computer system to perform: identifying, by the input receiver, a function associated with the instruction.

27. The non-transitory computer-readable medium of claim 19, wherein the user interface device includes a mouse or a keyboard.

* * * * *

UNITED STATES PATENT AND TRADEMARK OFFICE
CERTIFICATE OF CORRECTION

PATENT NO. : 8,451,222 B2  
APPLICATION NO. : 12/562347  
DATED : May 28, 2013  
INVENTOR(S) : Stephen Joseph Minutillo et al.

Page 1 of 1

It is certified that error appears in the above-identified patent and that said Letters Patent is hereby corrected as shown below:

In the Specification:

COLUMN 3:

Line 30, "input director 308" should read --input director 302--; and  
Line 65, "PC windowing system 302" should read --PC windowing system 304--.

COLUMN 5:

Line 32, "is includes" should read --includes--.

COLUMN 9:

Line 44, "wherein" should be deleted.

Signed and Sealed this  
Twenty-ninth Day of April, 2014

Michelle K. Lee  
*Deputy Director of the United States Patent and Trademark Office*